March 5, 1968     B. E. COLGAN     3,371,961
FITTING FOR MOUNTING HEADRESTS
Filed Jan. 30, 1967
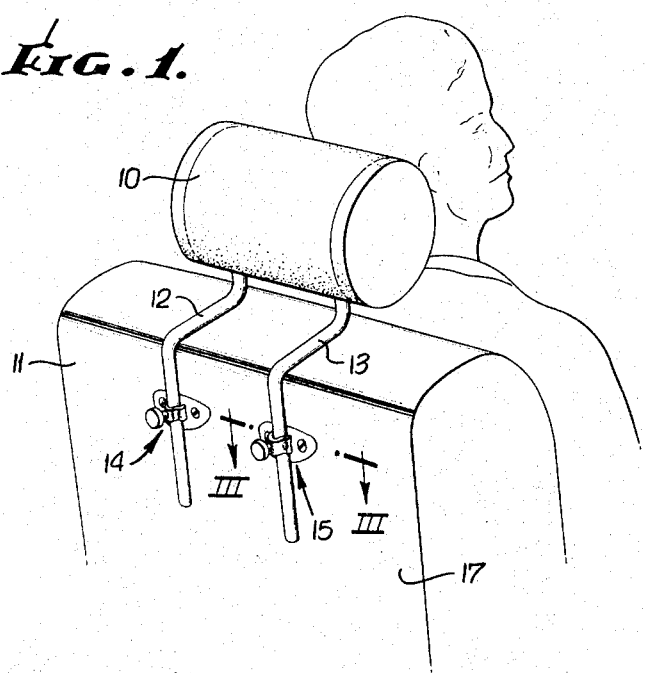
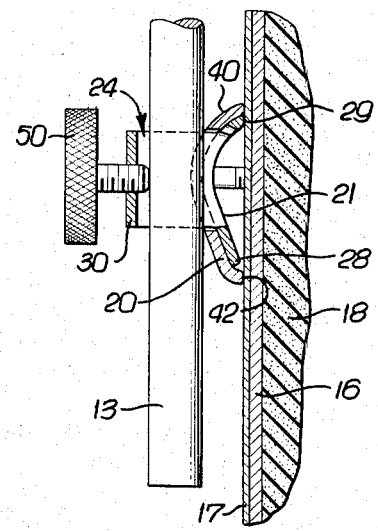
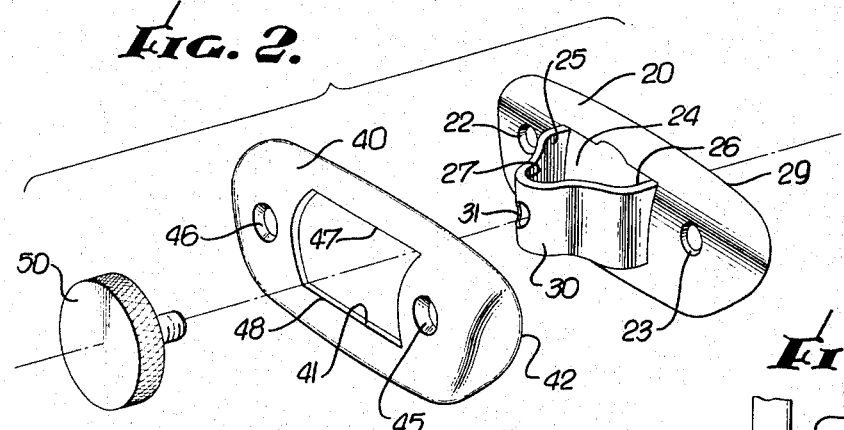
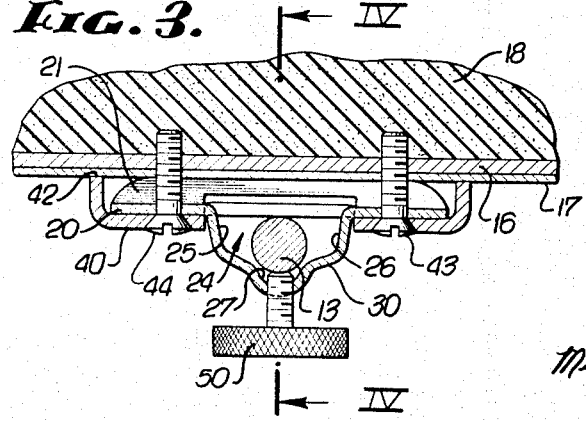
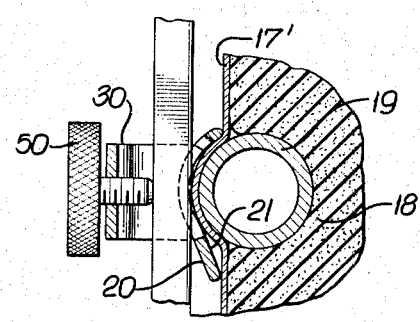
INVENTOR.
BILLIE E. COLGAN
By Miketta, Glenny, Poms & Smith
ATTORNEYS.

United States Patent Office 3,371,961
Patented Mar. 5, 1968

3,371,961
FITTING FOR MOUNTING HEADRESTS
Billie E. Colgan, Sunland, Calif., assignor to American
Safety Equipment Corp. of California, Sherman Oaks,
Calif., a corporation of California
Filed Jan. 30, 1967, Ser. No. 612,594
4 Claims. (Cl. 297—397)

ABSTRACT OF THE DISCLOSURE

An improved fitting construction for mounting round or rectangular cross-section headrest supporting frame members to round bar or flat sheet metal framing of vehicle seat backs. A base member with a concave surface to abut round frame members of vehicle seat back constructions and a crown portion to receive and mount round or flat headrest support frame members or bars with an associated thumb screw is provided with an additional cooperating, reinforcing and base enclosing housing or bell to fit over the base member, the base member crown portion protruding through an aperture in the housing or bell to receive and mount a headrest supporting frame member, to continuously bear against flat seat back framing about said base member and to transmit loading on the headrest into said seat back frame about said base member.

Background of the invention

Headrests have long been used in vehicles to provide a cushion behind passengers' heads. More recently, the use of such headrests has been recognized as being a very desirable safety device which greatly reduces the likelihood of neck injuries, frequently termed "whiplash," to vehicle passengers in the event of vehicle collisions, particularly where the passengers' vehicle is involved in a rear end collision. New federal safety laws are presently being enacted which require the provision of headrests as original equipment in new automobiles and probably eventually in the after-market or used-automobiles.

In mounting a headrest to a vehicle seat back, the headrest may be mounted upon a single post slidably mounted within the seat back or in most instances, particularly in installations where a headrest is added to a previously manufactured and installed vehicle seat, by a headrest supporting frame secured to the rear surface of the vehicle seat back. Such headrest frames normally include a pair of spaced vertically oriented round or rectangular cross-sectional bars which are secured to the vehicle seat back frame by appropriate fittings. Many seat back frames consist of a plurality of round bars welded together to provide a framework for the mounting of springs, cushions and covering fabric. In many modern vehicle seat backs, however, a flat sheet metal plate-like frame member is provided across the back of the vehicle seat.

Heretofore, a plurality of different fitting constructions have had to be employed for the different types of vehicle seat back framing as well as the different types of headrest supporting framework bar members. Headrest manufacturers and installers have had to maintain large stocks of these different types of fittings in order to meet the differing requirements of the various types of installations. In many instances, the properly shaped or constructed fitting has been unavailable and fittings have been employed in installations for which they are not designed. Such installations are not only unsightly, but frequently fail to provide the proper contact, stability and strength of mounting for the headrest support frame members to the vehicle seat back framing. This can prove disastrous in a vehicle accident should the headrest mountings fail to transmit the impact of a passenger's head against the headrest into the seat back framing without breaking, deforming or otherwise yielding. With the greater importance being attributed to the safety factor of vehicle headrest, a strong, stable and secure mounting for the headrest in every installation is an absolute necessity.

Summary of the invention

In view of the foregoing, it is the principal object of the present invention to disclose and provide a single fitting construction which is universally adaptable to each differing type of vehicle seat back installation for headrests employed. It is a further object of the present invention to disclose and provide such a universally adaptable fitting construction which is particularly adapted to mount headrest frame assemblies to vehicle seat back framing having flat sheet metal or plate-like framing in a novel secure and stable manner wherein loading on the headrest is transmitted through the headrest supporting frame into the flat framing of the vehicle seat back over a relatively large area, yet is readily adapted to being mounted to round bar framing of vehicle seat backs.

According to the present invention, a base member is provided with a concave inner surface for mounting against round bar framing of seat backs. A crown portion is formed integrally with the base and is adapted to receive either rectangular or round bars of a headrest supporting frame assembly. A thumb screw is employed for holding the headrest supporting frame bars in an adjustable position with the crown portion. An additional reinforcing and covering housing or bell is provided to fit over the base member with a central aperture to receive the crown portion therethrough. The housing or bell includes depending marginal edge surfaces generally encircling or surrounding the base member to abut a flat surface provided by a sheet metal or plate framing member of a vehicle seat back. The single fitting is thus universally adaptable to either round bar or flat surface framing of vehicle seat backs as well as for mounting either round or rectangular cross-sectioned bars of headrest supporting frames, as described in more detail hereinafter.

The foregoing objects as well as additional advantages and improvement features of the fitting according to the present invention will become apparent to those skilled in the art from a consideration of the following detailed explanation of the preferred exemplary embodiment of the fitting of the present invention. Reference will be made to the appended sheet of drawings in which:

FIG. 1 is a perspective view of a headrest supported by a frame assembly which in turn is assembled to the rear portion of a vehicle seat back by means of the improved fittings according to the present invention;

FIG. 2 is an exploded perspective view of the preferred exemplary embodiment of fitting for mounting headrest supporting frames according to the present invention;

FIG. 3 is a horizontal sectional view of the headrest supporting frame assembly fitting of FIG. 1 taken therein along the plane III—III.

FIG. 4 is a side elevational view, partially in section, of the fitting of FIG. 1 fastened to a flat seat back frame member; and FIG. 5 is a side elevational view, partially in section, of the fitting of FIGS. 1 through 4 when mounted to a round frame member of a vehicle seat back.

Referring first to FIG. 1, a conventional headrest 10 may be mounted to a vehicle seat back 11 by a supporting frame assembly including support assembly bars 12 and 13. The headrest and its supporting frame assembly may be constructed in accordance with that disclosed in the prior Brown Patent No. 3,205,005.

The headrest supporting frame assembly is mounted to the rear of the vehicle seat back 11 by means of the novel fittings, indicated generally at 14 and 15 in FIG. 1, according to the present invention. In the exemplary embodiments of FIGS. 1, 3 and 4, the fittings indicated generally at 14 and 15 are secured against a flat metal seat frame member 16, as seen best in FIGS. 3 and 4. A fabric or vinyl covering 17 may be provided enveloping the seat back frame member 16 as well as the cushion portion 18 as in conventional vehicle seat constructions.

Referring now to FIG. 2, it can be seen that the fitting according to the present invention in the preferred exemplary embodiment comprises a base member 20 having a crown portion 30, a reinforcing and covering housing or bell 40 and a fastening means for holding a bar received through crown portion 30, such as the thumb screw 50.

When the fitting is to be mounted to a conventional seat back frame having round frame members, as member 19 in FIG. 5, the reinforcing and covering housing or bell 40 is not employed as seen in FIG. 5. In order for the base member 20 to fit snugly and securely against the round frame member 19, it is provided with an inner concave surface 21 to fit over the vinyl or cloth covering 17' around bar 19. Conventional metal screws may be screwed into the bar 19, passing through the chamfered holes 22 and 23 in the base member, to mount base 20 securely to the framing bar 19. When the base member is to be secured to a vehicle seat back frame having a flat surface, as seen in FIG. 4, the additional covering housing or bell 40 must be employed as hereinafter explained.

Crown portion 30 is preferably formed integrally with the base member 20 extending generally perpendicularly outwardly of the base in a direction opposite to the direction inner concave surface 21 faces. Crown portion 30 is provided with a vertically transverse aperture, indicated generally at 24 in FIG. 2, to receive either flat or round bar portions of a headrest supporting frame assembly. As best seen in FIGS. 2 and 3, crown portion 30 has first aperture portions 25, 26 to receive flat bars and a second rounded aperture portion 27 to receive round bars therethrough. The threaded aperture 31 in the crown portion 30 is adapted to receive the thumb screw 50 to secure either flat or round bar members of a headrest support frame against associated portions of the base member, as seen in FIG. 5.

As particularly contemplated within the present invention, the fitting of the preferred exemplary embodiment is adapted to securely mount round or flat bars of headrest supporting frames to a flat framing member of vehicle seat back as particularly seen in FIG. 4. It may be seen that the base member 20, if mounted against the flat frame member 16 would abut such frame member only along limited portions of its upper and lower edges. Not only does this leave unsightly open spaces at either end of the concave base member 20, but also does not provide a satisfactory, sufficiently stable mounting for the headrest supporting frame to transmit impact forces on the headrest into the vehicle seat back without failure thereof. In order to overcome this deficiency and to provide a universally adaptable fitting, the fitting of the present invention is provided with not only the base member 20, its integral crown portion 30 and thumb screw 50, but with an additional reinforcing and covering housing 40 to be employed when the fitting is to be secured to flat frame members of vehicle seat backs.

Housing or bell 40 is provided with a central aperture 41 to receive the crown portion 30 therethrough when placed over base member 20. Housing or bell 40 is adapted to overlie and surround the base member 20, as best seen in FIGS. 3 and 4, and has outer depending marginal edge surfaces 42 generally encircling the base member 20 and abutting the seat back covering 17 and underlying flat frame member 16. Marginal edge surfaces 42 of housing or bell 40 lie in a plane generally even with that defined by the outer extremities 28, 29 of the base member concave surface which also tend to abut the seat back frame as previously described. Housing marginal edge surfaces 42 are thereby adapted to abut the flat seat back frame 16, through fabric 17, about the base member 20 in a base encircling, continuous, stable contact with the seat back frame 16. Loading on headrest 10 is thus transferred through bell 40 into the seat framing over a greater area if contact and in a much more reliable manner.

Fastening means are provided for mounting the housing or bell 40 together with the enclosed base member 20 to the flat seat back frame 16 as best seen in FIG. 3. Such fastening means may include metal screws 43 and 44 adapted to pass through the chamfered openings 45 and 46 of housing or bell 40, openings 23 and 22 of the base member 20 and fasten into the flat frame member 16 of the vehicle seat. The thumb screw 50 may be considered a second fastening means for mounting the headrest support frame bar 13 within the crown portion 30. As best seen in FIG. 4, as thumb screw 50 is screwed through the threaded aperture 31 of crown portion 30 against the headrest supporting frame bar 13, bar 13 is tightly forced against the widely spaced upper and lower edges 47 and 48 of aperture 41 provided by the housing or bell 40.

Crown portion 30 is forced outwardly of the housing or bell 40, as bar 13 is forced against the bell 40 by thumb screw 50, causing the support member 20 to be tightly pulled into housing or bell 40, as best seen in FIG. 4. The lower edge or outer extremity 28 of base member 20 is pulled completely within the housing or bell 40 out of any abutting relationship with the frame 16. Housing or bell 40 thereby presses against the supporting frame 16, through fabric 17, continuously about and encircling the base member providing a very stable, secure and finished looking fitting or mounting for the headrest supporting frame members or bars 12 or 13.

Having thus described the preferred exemplary embodiment of fitting for mounting headrest supporting frames to vehicle seat backs, it should be understood that the foregoing detailed description is exemplary in nature only and that other embodiments, alternatives and modifications may be made within the present invention which is defined by and limited only by the following claims.

I claim:

1. A headrest supporting frame assembly fitting for securely mounting round or flat bars of headrest supporting frames to round bar or flat sheet metal framing of vehicle passenger seat backs, said fitting comprising:
   a base member to abut and be secured to a vehicle seat back frame, said base member including an inner concave surface facing said seat back frame;
   a crown portion integral with said base and extending generally perpendicularly outward of said base in a direction opposite to the direction said concave surface faces, said crown portion having a vertically transverse aperture therethrough including a first aperture portion to receive rectangular bars and a second aperture portion to receive round bars therethrough;
   a reinforcing and covering housing to fit over said base member and including a central aperture to receive said crown therethrough when placed over said member, said housing having outer depending marginal edge surfaces generally encircling and lying in a plane generally even with that defined by the outer extremities of said base member concave surface abutting said seat back frame, said housing marginal edge surfaces being thereby adapted to abut a flat seat back frame about said base member; and
   fastening means for securing said housing and base member to said vehicle seat back frame.

2. The fitting of claim 1, wherein additional fastening means are provided in association with said crown portion to force a headrest support frame bar against said reinforcing and covering housing in tight stationary assembled relation whereby loading on said headrest is transmitted from said support frame bar through said cover plate and base member to said vehicle seat back frame.

3. In a fitting for mounting headrests to vehicle seat backs including a base member having a concave surface to abut and be secured to round seat back framing members and an an apertured crown portion to receive and mount a bar of the headrest supporting frame, the improvement comprising the provision of:
a combination cover and reinforcing bell to fit over said base member and having a central aperture to receive said base member crown portion therethrough, said bell having means for fastening to said seat back framing member through said base member and outer marginal edge surface to abut said seat back frame member in a generally continuous planar contact therewith around said base member.

4. In the fitting of claim 3, the further provision of:
a laterally transverse aperture through said crown portion to receive an associated headrest supporting frame bar, said transverse aperture including a first generally rectangular aperture portion to receive flat bars and a second circular aperture portion to receive round bars, said first and second aperture portions intersecting each other and being adjacent said base member; and
additional fastening means associated with said crown portion for forcing said associated headrest supporting frame bar against said cover and reinforcing bell.

References Cited

UNITED STATES PATENTS

| | | | |
|---|---|---|---|
| 2,893,666 | 7/1959 | Cousins | 248—295 X |
| 3,205,005 | 9/1965 | Brown | 297—397 |
| 3,253,859 | 5/1966 | Merriman et al. | 297—397 |

CASMIR A. NUNBERG, *Primary Examiner.*